B. F. FITCH.
SYSTEM OF HANDLING FREIGHT.
APPLICATION FILED MAY 16, 1919.

1,404,947.

Patented Jan. 31, 1922.
7 SHEETS—SHEET 4.

Inventor
Benjamin F. Fitch,
By Bates & Macklin,
Attorneys

UNITED STATES PATENT OFFICE.

BENJAMIN F. FITCH, OF EVANSTON, ILLINOIS, ASSIGNOR TO MOTOR TERMINALS COMPANY, OF WILMINGTON, DELAWARE, A CORPORATION OF DELAWARE.

SYSTEM OF HANDLING FREIGHT.

1,404,947.      Specification of Letters Patent.      Patented Jan. 31, 1922.

Application filed May 16, 1919. Serial No. 297,461.

*To all whom it may concern:*

Be it known that I, BENJAMIN F. FITCH, a citizen of the United States, residing at Evanston, in the county of Cook and State of Illinois, have invented a certain new and useful Improvement in Systems of Handling Freight, of which the following is a full, clear, and exact description, reference being had to the accompanying drawings.

This invention relates to the mechanical handling of freight at freight houses, platforms, wharfs, docks, etc. More particularly, the system contemplates the employment of automobile trucks having removable bodies, which with their contained loads may be removed as a unit from the truck frame and suitably transported onto the platform, dock or other place where the system is installed, so that the contents of the body may be readily transferred therefrom to railroad trains, boats, or in some instances the entire body with its load placed on board. A reverse operation transfers the freight from an incoming train or boat to an automobile truck, enabling its transportation over city streets. My invention provides also for the transportation of removable bodies into and out of freight houses, covered docks, etc., through contracted doorways. It also provides for the moving of the bodies by power along the platforms or floors. The various features of the invention are hereinafter more fully explained and the essential characteristics are summarized in the claims.

Figure 1:
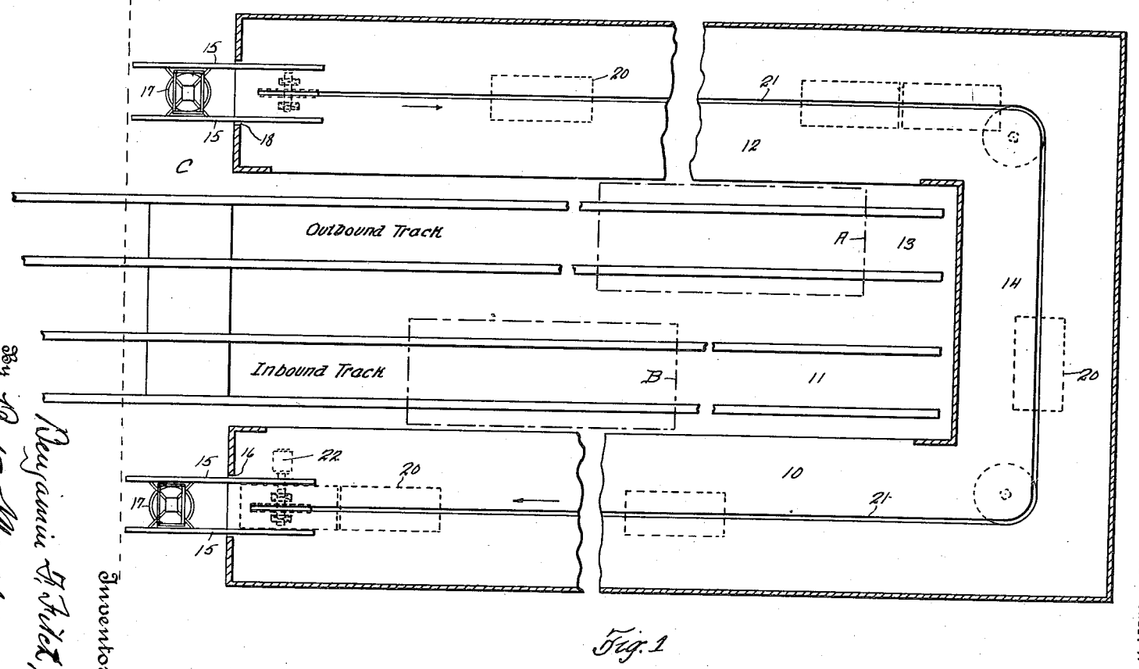
Fig. 1 is a diagrammatic sectional plan of a freight house equipped with my invention.

In Fig. 1, there is indicated a freight house, U-shaped in plan, to provide an inbound platform 10, coacting with a stub end inbound track 11 and an outbound platform 12, coacting with an outbound track 13. The city street C along which freight is brought to the freight house and carried from it is supposed to extend along the left hand end of the building indicated.

15 indicates two pairs of over-head trackways, each pair extending from a position over the street to the interior of the house over the corresponding platform and through a suitable doorway 16 or 18. Mounted on each of these pairs of trackways is a suitable bridge crane designated 17, which carries a turn table. This crane is adapted to engage the removable body of an automobile body beneath it, turn it a quarter way around and then travel with it through the doorway to position it lengthwise of the platform within the building. Several removable bodies appear in this figure indicated by dotted lines 20. 21 indicates a slot in the floor, beneath which is an accessible cable extending along the two platforms and moving toward the front of the inbound platform 10 toward the rear of the outbound platform 12. A suitable motor 22 may serve to propel this cable. Suitable means are provided for gripping each removable body to it.

The details of a convenient form of turn table bridge crane, and convenient means for gripping the automobile body to the cable will be hereinafter described. For the present let it be assumed that each removable body has wheels in its base by which it may be supported and rolled along the platform and that beneath the slots 21 are cables which may be gripped to the bodies. Now if an automobile truck having a loaded body is driven in front of the doorway 18, for example, the body may be raised by the crane 17, turned at right angles, and trolleyed through the doorway and deposited in the position lengthwise of the platform 12 in a convenient position where its contents may be hand-trucked to a receiving car A, standing on the outbound track.

After a removable body has been unloaded, the body may be gripped to the cable and drawn thereby around the end platform 14 onto the inbound platform 10. There the bodies are loaded; for instance, by hand-trucking from the car B standing on the inbound track. Then the body is transported by the cable to the front end of the inbound platform beneath the overhead trackway 15. Then it may be raised by the crane on this trackway, and trolleyed through the doorway 16, turned at right angles, and deposited on a truck body in the street C. The automobile trucks may thus arrive loaded in front of the doorway 18, and the truck frame moved empty under its own power across the tracks to a position in front of the doorway 16, and there receive a loaded body for transportation over a city street.

Figure 2:
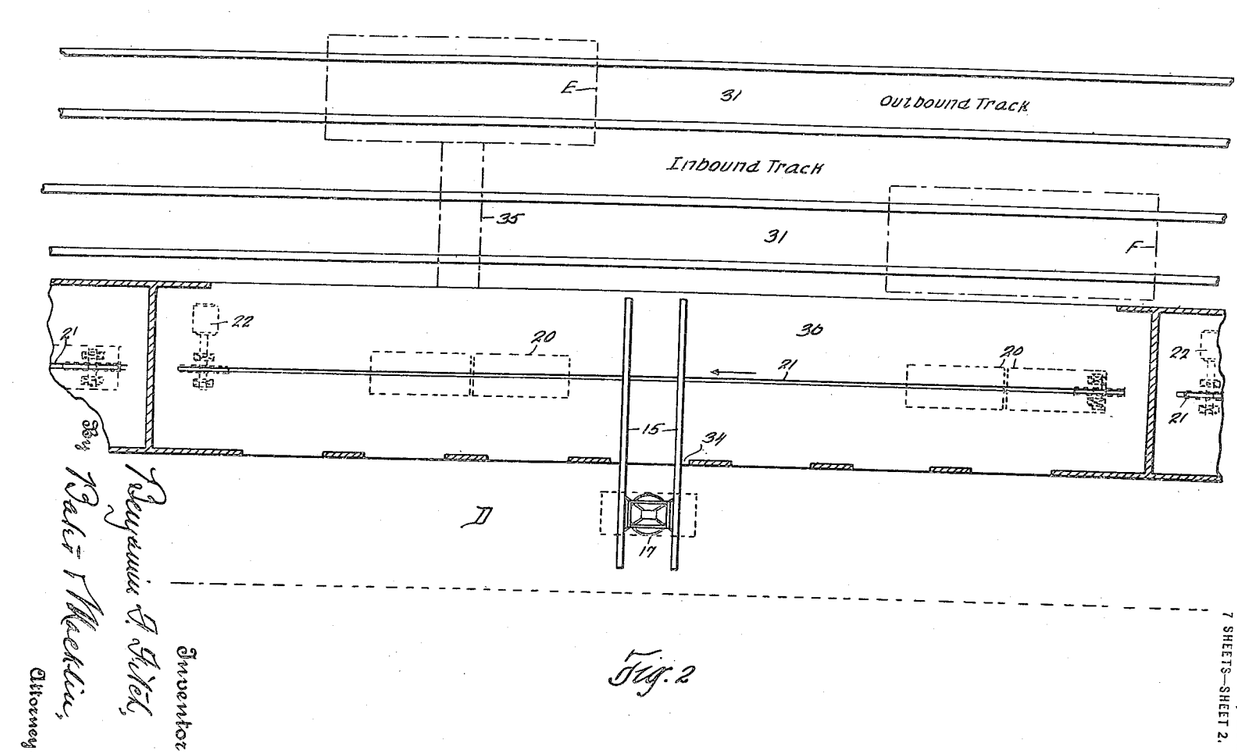
Fig. 2 is a similar plan of a somewhat different form of freight house equipped with this invention.

Fig. 2 illustrates an installation where the street D extends alongside of the freight house, the platform of which is designated 30. Railroad tracks as 31, 32, are located along the other side of this freight platform. The traveling crane 17 in this case may receive a removable body standing more or less parallel with the side of the freight house, turning it a quarter way around, trolley it through the door way 34 and again turn it a quarter way around and deposit it in a longitudinal position on the platform above the cable slot 21. When the body is gripped to the cable it is shifted longitudinally into a position conveniently accessible to the railroad cars.

In the installation of Fig. 2, I have indicated the cable traveling toward the left, toward the outbound portion of the freight house. Loaded bodies 20 deposited within the house are gripped to the cable and passed to the left into the position where their contents may be conveniently hand-trucked to an outbound car indicated E, a suitable bridge structure or transverse runway 35 providing access to this car. When the body 20 has been unloaded it may be readily rolled by hand along the edge portion of the platform to the right hand part where it stands opposite an inbound car F and freight from such car may be hand-trucked into the body. The body may be then gripped to the cable and brought beneath the track-way 15. Then it may readily be raised, turned, transported through the doorway 34, turned again and readily deposited on an automobile truck frame.

Figure 3:
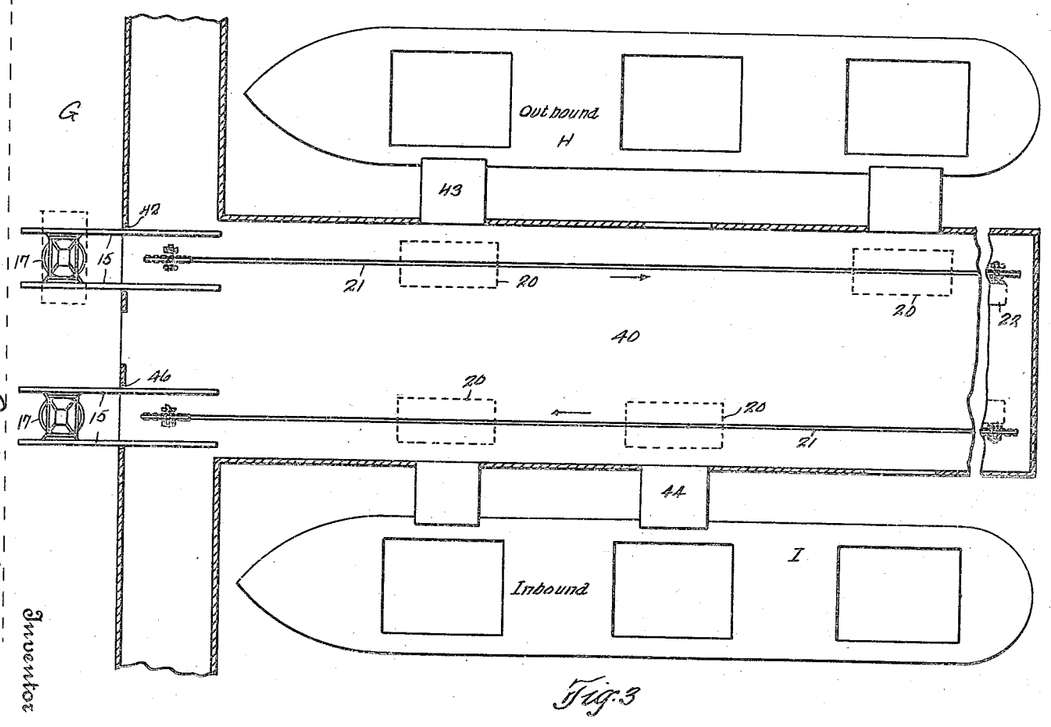
Fig. 3 is a diagrammatic sectional plan of the invention adapted for boat docks.

Fig. 3 indicates an installation of the system on a wharf or dock. In this installation, G indicates the street or automobile runway along the front of the wharf house. 40 indicates the wharf proper. One side of this platform (as the upper side in the view) may be for outbound freight and the other side for inbound freight. H indicates an outbound vessel and I an inbound vessel.

The crane 17 takes the removable body from the automobile in the street, raises it, turns it at right angles, trolleys it through the doorway 42, and deposits it over the cable slot 21. Thence the cable transports it to a suitable position opposite the gang plank 43 leading to the outbound vessel. When the body has been entirely unloaded, it may be rolled by hand to the other side of the platform and deposited in front of a gang plank 44 and the body loaded, after which it may be gripped to the cable and propelled thereby to the left hand end or front of the house. There it is raised by the crane, trolleyed through the doorway 46, given a quarter turn and deposited on an automobile frame in the street G.

Figure 4:
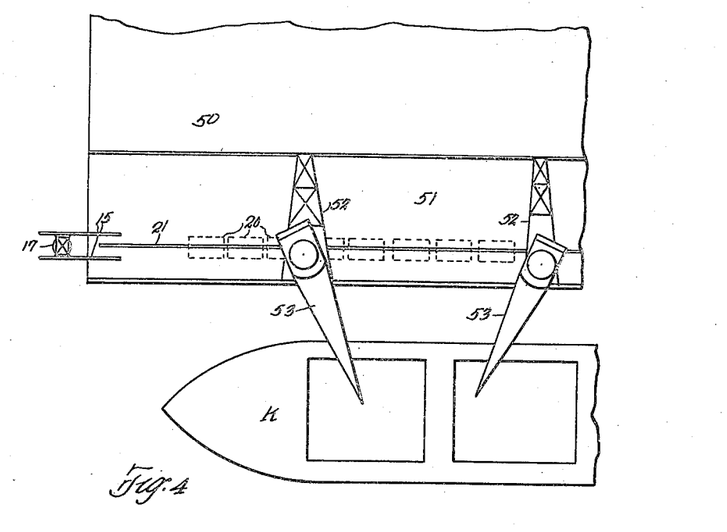
Fig. 4 is a diagrammatic plan of the invention adapted for a lighter.
Figure 5:
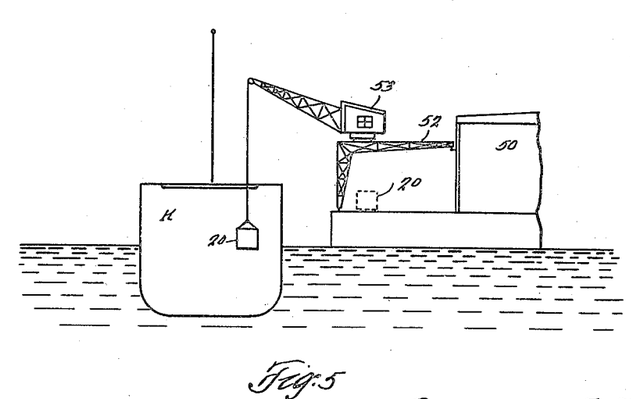
Fig. 5 is an end elevation of the adaptation shown in Fig. 4.

Figs. 4 and 5 illustrate the system as adapted for use on freight loading lighters, or floating docks. In this instance, the trolley trackways 15 are either carried by one end of the lighter 50 and adapted to overhang a street runway when the lighter is docked, or they are carried stationarily above such runway and overhang the lighter when it is docked. In either case when the lighter is docked, this trackway is supported partly above the automobile runway and partly above the lighter. It will be seen that the traveling crane 17 may take the loaded body from an automobile truck and place it on the lighter or vice versa, and that the cable in the slot 21 is adapted to transport the body lengthwise of the lighter. To transfer the load from the lighter to the vessel at K, I prefer to shift the whole body and deposit it in the vessel, and to that end I may provide overhead supports 52 which carry swinging cranes 53 adapted to pick up a body from the lighter platform 51 and swing it over the vessel and deposit it in the hold thereof, or remove the body from the hold and deposit it on the platform. The cable may be reversible to transport all the loaded bodies along the lighter toward the crane or cranes 53, and thereafter transport a series of bodies in the opposite direction for discharge when the lighter has docked.

Figure 6:
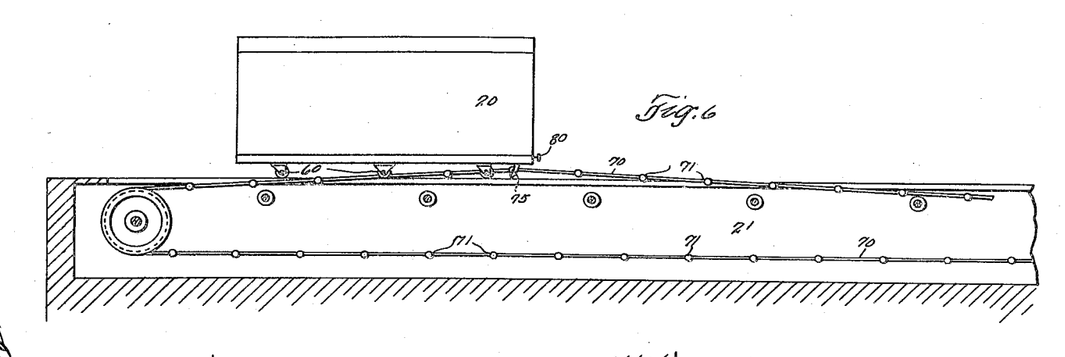
Fig. 6 is a vertical longitudinal section through a freight house, or lighter showing the transporting cable construction.
Figure 7:
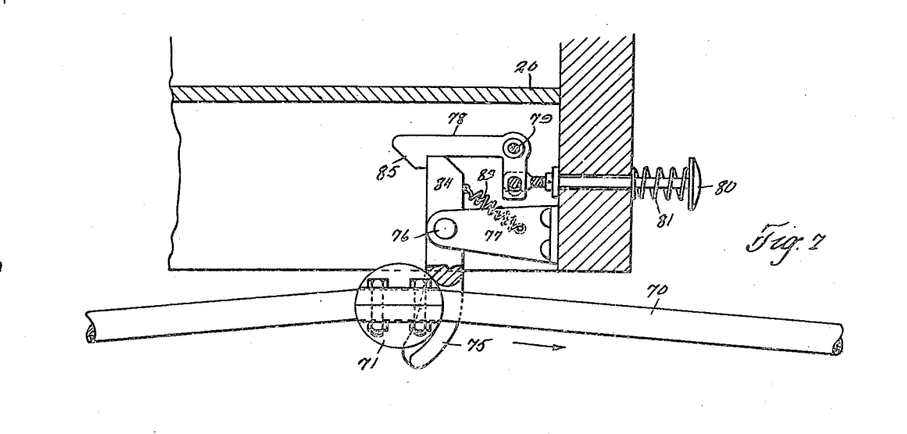
Fig. 7 is a detail in vertical section showing the releasable connection between a truck-body and the cable.
Figure 8:
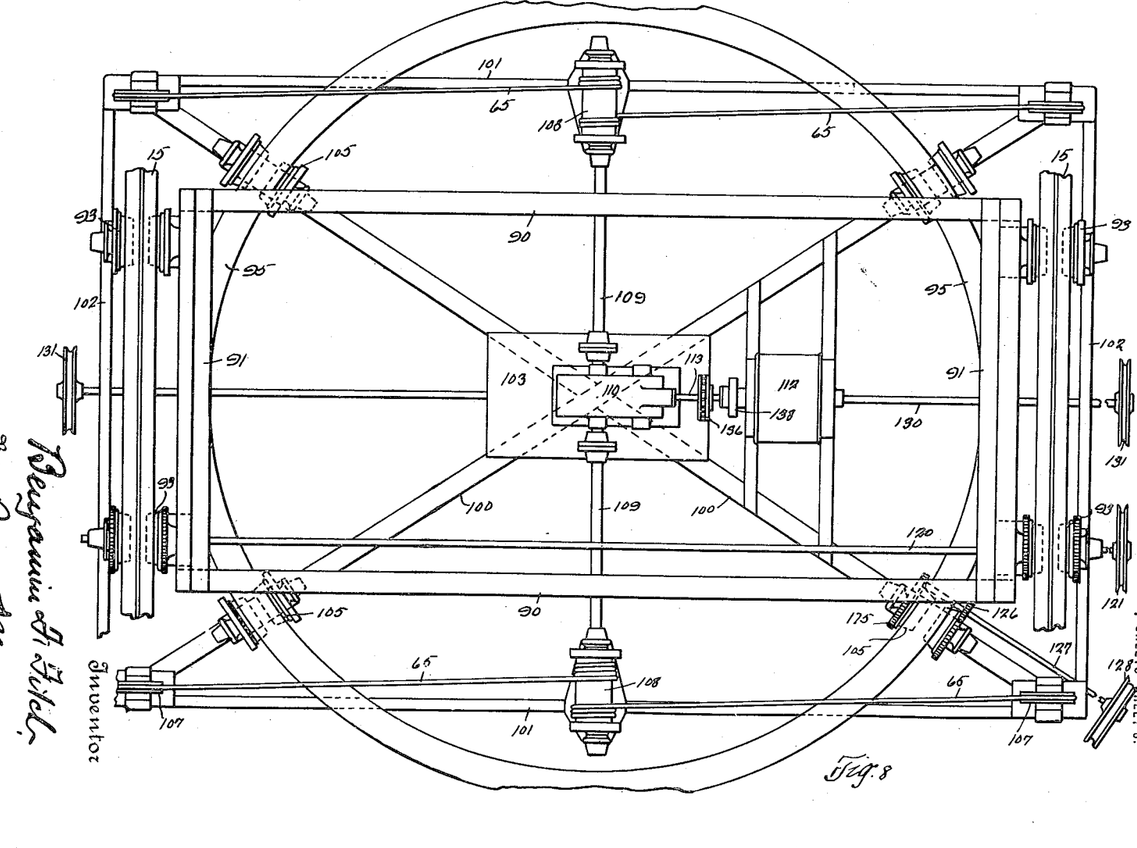
Fig. 8 is a plan of a traveling crane adapted for use in this system.
Figure 9:
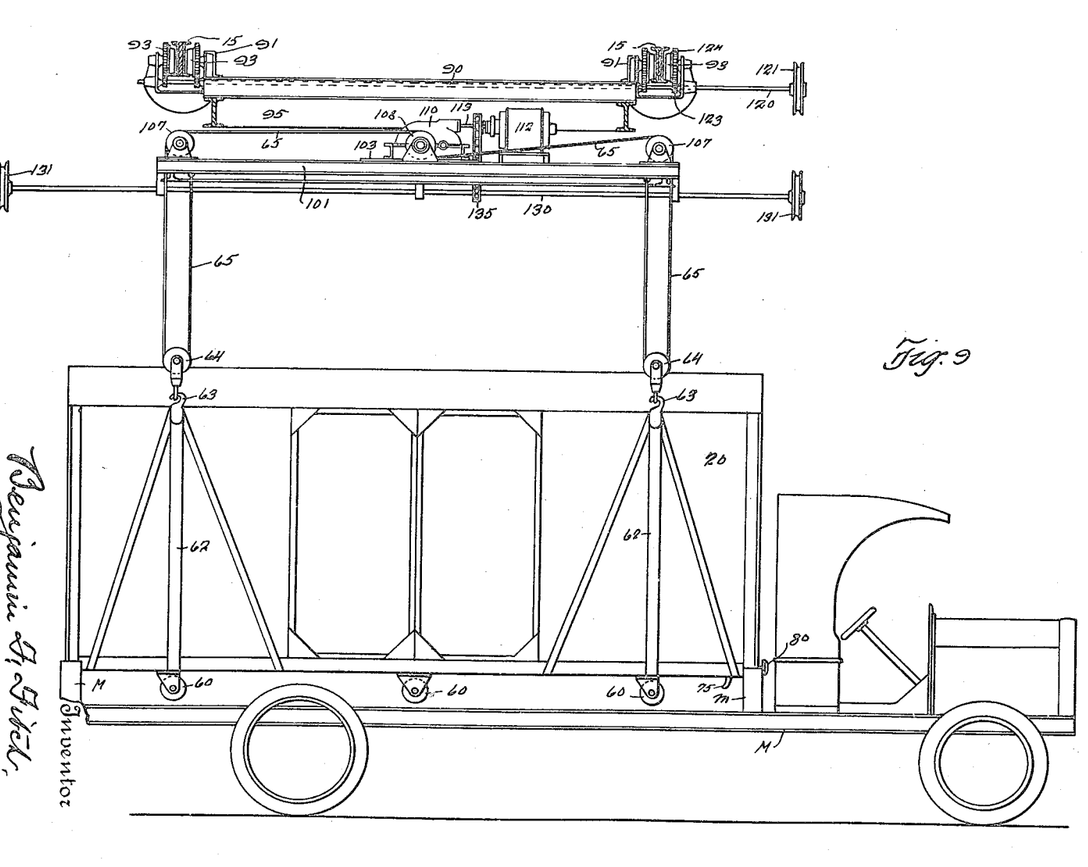
Fig. 9 is a side elevation partly in section of the traveling crane shown in Fig. 8, this view showing also a removable automobile body about to be raised from its truck by said crane.

It will be seen that in all of the installations illustrated, I employ a traveling crane, a short trackway therefor, sufficient to transport the body from the automobile runway to the platform and vice versa. I also employ in each case a traveling cable to draw the body along the platform. Fig. 9 illustrates an automobile truck equipped with a removable body having wheels in its base, which is adapted for use in part of my system. This view and also Fig. 8 illustrate a traveling crane with a turn table which may be employed to elevate the body and turn it or lower it. Figs. 6 and 7 illustrate a convenient cable mechanism for drawing the body along the platform after it has been deposited thereon.

The removable body 20 may be of any convenient form adapted to be mounted on an automobile body and having wheels in its base, by which it may be rolled on a platform. In Fig. 9, M indicates the automobile frame. The body 20 is arranged to be supported thereby, the frame having suitable centering means indicated at m. 60 indicates the supporting wheels carried by the body. I find it convenient to provide a pair of these respectively near the opposite edges and swiveled pairs near the front and a swiveled pair near the rear, these latter pairs being comparatively close together. This construction enables the convenient manipulation of the body and also provides for the cable being central with reference to the body and out of engagement with any of the wheels. 62 indicates suitable supports on the body terminating in hooks 63, near the top of the body, which may be engaged by movable pulleys 64 on the crane mechanism. When these pulleys are drawn up by their respective cables 65, the body is elevated evenly and may be turned, trolleyed through the doorway and deposited on the platform or vice versa.

Referring to Figs. 6 and 7, there will be seen in or below the cable slot 21, a cable 70 having on it at intervals, suitable stops 71 which may be in the form of ball shaped members clamped on the cable. Each removable body is equipped with a jaw 75 pivoted at 76 to a bracket 77, the jaw having a fork at its lower end adapted to straddle the cable and be engaged by the adjacent ball 71 thereon. Above the pivot this jaw is normally held by a latch 78 which is in the form of a bell crank pivoted at 79. The other arm of this bell crank is connected with a plunger 80, which is normally held in the position shown in Fig. 7 by a spring 81.

When the cable 70 is moving in the direction of the arrow in Fig. 7, the ball stop 71 engaging the hook 75 of a removable body will pull the upper end of that jaw tightly against the latch 78 which stops it, making it rigid, so that the pull of the cable moves the whole body toward the right. When the body comes into contact with the preceding body, and it is desirable that its connection with the slowly moving cable be released, its plunger 80 is thereby forced inwardly against the action of the spring 81. This raises the latch 78 and releases the jaw 75 and the lower end of it swings forward and thus drops the cable. Then the jaw is drawn back to normal position by its spring 83, the inclined upper end 84 of the jaw striking and sliding below the inclined end 85 of the latch. The spring 83 therefore holds the jaw in position for re-engaging the latch whenever the pressure on the bumper head 80 is removed.

The entrance from the top into the cable slot 21 may readily be narrow enough so that it would not be possible for any of the wheels 60 to drop into the slot. The slot is somewhat wider however than the diameter of the ball 71. The unengaged part of the cable lies entirely beneath the platform floor in the cable conduit, but whenever it is desired to couple the car to the cable, the cable may be simply lifted manually (as by means of the handhook passed through the cable slot) so that the cable passes through the fork of the jaw 75. Then as soon as the next ball 71 engages the jaw the rearwardly curved lower portion of the jaw together with the pull on the cable will cause continuous engagement of the cable and body 20 until the bumper plunger is engaged or the pull on the cable stops.

In some installations it is desirable to operate the cable continuously and others to operate it intermittently. The latch provides not only for the automatic uncoupling of the body and cable whenever the body reaches the end of its available travel, but provides convenient means whereby the attendant may release the body whenever desired by simply pushing with his foot on the plunger head 80. It is to be understood that though the transportation is as rapid as desirable and convenient on a freight platform, it is comparatively slow in miles per hour and the attendant has no difficulty in either raising the running cable to clutch it to the car or operating the plunger head 80 with his foot to release it.

The characteristics of the traveling crane, which I employ are that it has a bridge frame with wheels running on the two parallel trackways 15, has a supplemental frame swiveled to the bridge frame, and has four raising members depending from the supplemental frame and adapted to engage four hooks on opposite sides and near opposite ends of the removable body. The particular traveling crane shown in Figs. 8 and 9 forms part of the subject matter of my application No. 292513 filed April 24, 1919, and is claimed therein, and reference may be had to that application for fuller description. Briefly it is as follows, reference being had to Figs. 8 and 9.

The bridge frame of the traveling crane shown is an open horizontal structure comprising cross beams 90 and end beams 91 which are parallel with the trackways 15. These beams 91 carry four sets of supporting wheels 93, each set being located at one of the corners of the frame and comprising a pair of wheels tracking on the lower flange of the trackway 15. The frame also carries a turn table or circular trackway 95 beneath the frame. The supplemental frame shown comprises diagonal beams 100 and front and rear beams 101 and end beams 102 connecting with the ends of the diagonal beams, and a gusset plate 103 mounted on and bracing the diagonal beams. These diagonal beams carry four sets of wheels 105, each set comprising a pair of wheels adapted to track on the lower flange of the circular trackway 95.

On each corner of the supplemental frame is a guide sheave 107 over which a cable 65 depends. Suitable means are provided for drawing up on the four cables at once, so that the body 20 may be raised evenly at four points. For simultaneously operating the four cables 65, I have provided two drums 108 on aligned shafts 109. These shafts connect with suitable gear reduction mechanism contained in a housing 110, mounted on the gusset plate 103. A suitable motor 112 is connected with the gearing, as for instance, by a worm coupled with the armature shaft 113, and meshing with a worm wheel (not shown) in the casing.

It will be seen that the removable body may be raised or lowered by the operation of the motor 112, and that when the body is free from the automobile frame, it may be turned about a vertical axis by swinging the supplemental frame on the supporting frame, the wheels 105 rolling around the trackway 95. The whole structure, whether the body be turned or not, may be transported by moving the main frame along the trackway 15.

To move the main frame on the trackway, I prefer to provide a shaft 120 having a hand chain wheel 121, and on this shaft I place pinions 123 meshing with gears 124 formed on the corresponding supporting wheels 93. As shown, the shaft extends entirely across the frame and is geared with two sets of wheels at the two front corners of the frame. To shift the supplemental frame on the main frame, I provide one of the pairs of wheels 105 with gears 125 which mesh with pinions 126 on a shaft 127 which has a hand chain wheel 128. The hand chain wheels 128 and 121 are located adjacent each other so that one attendant may conveniently operate both hand chains.

To enable the operation of the raising cables by hand power, should electric current not be available, I provide a shaft 130 carried on the supplemental frame and having hand chain wheels 131 at its ends. On this shaft is a sprocket wheel connected by a sprocket chain 135 with a sprocket wheel 136 loose on the worm shaft 113. This worm shaft is normally clutched to the armature and has means whereby it may be clutched to the sprocket wheel 136. When so clutched the hand chains on the wheels 131 may operate the raising cables.

Attention is called to my application No. 396,893 filed July 17, 1920, as a continuation in part of this application, and as having claims covering certain subject matter illustrated herein.

Having thus described my invention what I claim is:—

1. In an apparatus for handling freight, the combination with a station platform, of a set of removable automobile bodies, a truck runway adjacent the platform, an overhead crane adapted to raise a body from the truck and deposit it on the platform, and an endless conveyor means on the platform for transporting the body along the platform.

2. In an apparatus for handling freight, the combination with a set of railroad tracks, of a station platform adjacent said tracks, a truck runway adjacent the platform, an overhead crane adapted to raise a body from the truck and deposit it on the platform, means on the crane for rotating the load about a vertical axis and means extending longitudinally of the station platform, for engaging a body and transporting it longitudinally of the platform.

3. In an apparatus for handling freight, the combination of inbound and outbound freight transportation lines, a freight station having a platform extending parallel to said lines, a truck runway adjacent the platform, overhead tracks extending over the truck runway and above the platform, a crane movable on said tracks, an endless conveyor carried by the platform, the path of the conveyor being directly beneath the path of the crane, whereby a load may be transferred from a truck by the overhead crane and then deposited on the conveyor for transportation along the platform.

4. In an apparatus for handling freight, the combination with a set of transportation lines, of a station platform extending parallel to said lines, a truck runway adjacent the platform, a set of removable automobile bodies, an overhead crane adapted to travel over the truck runway and over a part of the platform, an endless conveyor extending longitudinally of and positioned beneath the platform, the path of said conveyor being so arranged with relation to the path of the crane, whereby a load may be transferred from the crane to the conveyor and vice versa by operation of the hoisting mechanism on the crane.

5. The combination with a structure having a doorway, of an overhead trackway extending from the interior of the structure to the exterior through the doorway, a traveling crane mounted on said trackway and adapted to move through the doorway, said traveling crane having means for turning the load about a vertical axis, and endless conveyor means directly beneath the crane for transporting the load within the structure.

6. The combination of a structure provided with a platform and a wall with a doorway through it, a pair of overhead trackways extending from the interior of the structure to the exterior through said doorway, a truck runway adjacent the platform and beneath the trackway, a traveling crane adapted to ride on said trackway, raising means on the crane for engaging a load at separated points, means for turning the load so raised to enable it to pass through the doorway, and conveyor means positioned beneath the floor of the platform for transferring a load longitudinally of the platform.

7. The combination of a structure provided with a platform and a wall with a doorway through it, a pair of overhead trackways extending from the interior of the structure to the exterior through said doorway, a traveling crane adapted to ride on said trackway, means on the crane for engaging a load at separated points, means for turning the load so raised to enable it to pass through the doorway, and propelling means carried within the building adjacent to the platform extending from a point below the trackway, whereby a load may be transferred from one conveying mechanism to the other by operation of the hoisting means on the overhead crane.

8. The combination of a building having a platform, a wall and a doorway, a pair of overhead tracks extending from the interior of the building to the exterior through the doorway, a traveling crane mounted on said tracks and having a main frame and a supplemental frame swiveled to the main frame, means on the supplemental frame for engaging a removable body at separated points, mechanism for simultaneously operating said raising means, and an endless belt conveying mechanism beneath the overhead tracks, whereby a load may be transported by the overhead crane and then deposited directly on the belt conveyor or vice versa.

9. The combination with inbound and outbound freight transportation lines of a building having a wall with a doorway, a pair of trackways extending from the interior of the building through the doorway to the exterior, said building having a platform extending longitudinally of the lines, a traveling crane having a main frame with wheels on said trackways, and having a supplemental frame adapted to turn on the main frame, sheaves carried by the supplemental frame, elevating cables extending over said sheaves and adapted to engage the load at a plurality of points, means for turning the supplemental frame about a vertical axis, means for shifting the main frame to transport the load through the doorway, and endless conveyor means for transporting the load along the platform.

In testimony whereof, I hereunto affix my signature.

BENJAMIN F. FITCH.